(12) United States Patent
Chen (10) Patent No.: US 9,128,564 B2
(45) Date of Patent: Sep. 8, 2015

(54) OPTICAL TOUCH SYSTEM AND TOUCH SENSING METHOD

(71) Applicant: Wistron Corporation, New Taipei (TW)

(72) Inventor: Yu-Yen Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 136 days.

(21) Appl. No.: 14/078,532

(22) Filed: Nov. 13, 2013

(65) Prior Publication Data

US 2014/0333584 A1  Nov. 13, 2014

(30) Foreign Application Priority Data

May 7, 2013 (TW) .............................. 102116231 A (51) Int. Cl.
  *G06F 3/042*  (2006.01)
  *G06F 3/041*  (2006.01)
(52) U.S. Cl.
  CPC ............ *G06F 3/0428* (2013.01); *G06F 3/0416* (2013.01)
(58) Field of Classification Search
  CPC ......... G06F 3/041; G06F 3/045; G06F 3/042; G06F 3/043; G06K 11/06; G08C 21/00
  USPC .................... 345/173–175; 178/18.01–18.06
  See application file for complete search history.

(56) References Cited

U.S. PATENT DOCUMENTS

| | | | | |
|---|---|---|---|---|
| 2011/0102375 A1* | 5/2011 | Liu et al. | ........................ | 345/175 |
| 2011/0261018 A1* | 10/2011 | Chen et al. | ..................... | 345/175 |
| 2011/0267314 A1* | 11/2011 | Huang | .......................... | 345/175 |
| 2012/0318957 A1* | 12/2012 | Lai et al. | ..................... | 250/206.1 |
| 2014/0111481 A1 | 4/2014 | Tsai et al. | | |
| 2014/0306931 A1* | 10/2014 | Wei et al. | ....................... | 345/175 |

FOREIGN PATENT DOCUMENTS

| | | |
|---|---|---|
| TW | 201131445 | 9/2011 |
| TW | 201131446 | 9/2011 |
| TW | 201416945 | 5/2014 |

OTHER PUBLICATIONS

"Office Action of Taiwan Counterpart Application" with partial translation, issued on Mar. 23, 2015, p. 1-p. 22.

* cited by examiner

*Primary Examiner* — Pegeman Karimi
(74) *Attorney, Agent, or Firm* — Jianq Chyun IP Office (57) ABSTRACT

An optical touch system including a touch surface, a reflection structure and light source modules is provided. The reflection structure and the light source modules are disposed at a periphery of the touch surface. Each light source module has a light-emitting unit and a sensing unit. The sensing unit obtains a brightness value distribution of a sensing light emitted by the light-emitting unit after the sensing light is reflected by the reflection structure, so as to sense touch input. The periphery of the touch surface includes first and second sections. When the light-emitting unit located on the first section emits the sensing light, the sensing light is not reflected by the reflection structure at the light source modules located on the second section so that low-brightness areas are formed, and the light-emitting units of the second group emit compensation lights correspondingly. In addition, a touch sensing method is also provided.

19 Claims, 7 Drawing Sheets

OPTICAL TOUCH SYSTEM AND TOUCH SENSING METHOD

CROSS-REFERENCE TO RELATED APPLICATION

This application claims the priority benefit of Taiwan application serial no. 102116231, filed on May 7, 2013. The entirety of the above-mentioned patent application is hereby incorporated by reference herein and made a part of this specification.

BACKGROUND OF THE INVENTION

1. Field of the Invention

The present invention generally relates to a touch system and a touch sensing method, in particular, to an optical touch system and a touch sensing method.

2. Description of Related Art

In recent years, due to the convenience and intuitiveness on controlling, touch electronic products are favored by consumers and have become the mainstream in the market. In the resistive touch screen, the capacitive touch screen and the rear projection touch screen that are conventionally used in the electronic products, the capacitive touch screen has the best touch-sensing performance, but the manufacturing cost of the capacitive touch screen is the highest as well. Further, with the increase of the size of the touch screen, the manufacturing cost is also increased, so the application of the capacitive touch screen is limited. To find an alternative for the capacitive touch screen, an optical touch screen employing an optical component for sensing touch positions has been proposed due to various advantages including low cost and high accuracy. Since the optical touch screen is more advantageous in a competitive market, it is also a choice for the large size touch panel.

In a conventional optical touch display, at least two optical modules each composed of an image sensor and a light emitting unit are disposed at suitable positions on periphery or corners of a screen, and reflection frames are disposed around the screen. The light-emitting units emit light toward the reflection frames and the reflection frames reflects the light, and the image sensors sense a brightness state of the reflected light to determine whether an object exists on the screen and calculate the position of the object. For example, when a user's finger (or other object) moves onto the screen, the position of the shadow caused by the finger obstructing the reflected light can be sensed by the optical modules, and a precise touch position of the finger can be calculated accordingly. Generally, two optical modules only can sense positions of two fingers on the screen. The number of the optical modules has to be increased while more touch positions of fingers are to be sensed. However, the added optical modules will be disposed at positions adjacent to the two optical modules or positions on the frames or corners opposite to the two optical modules, so that a "face to face" problem is happened to at least one of the optical modules. The details are explicated below. The disposing positions of the optical modules are positions without reflection frame (such as a gap between two reflection frames). Therefore, when the light-emitting unit of one of the optical modules (hereinafter "optical module A") emits light toward the adjacent and opposite reflection frames, another optical module (hereinafter "optical module B") located in the gap of the opposite reflection frames is unable to generate a reflected light with the same intensity as that of a light reflected by the reflection frames. Thus, the image sensor of the optical module A will determine the intensity of the reflected light at the optical module B is not enough and a dark point exists correspondingly, which is mistaken as a touch object (such as a user's finger) obstructing the reflected light. Thus, the optical touch system is unable to recognize the real touch object and confusing situation happens, and it is hard to determine how many touch objects exist and the precise position of each touch object.

SUMMARY OF THE INVENTION

Accordingly, in order to overcome the problems of the above-mentioned conventional technique, the present invention is directed to an optical touch system and a touch sensing method, which can determine how many touch objects exist and the precise position of each touch object.

In an embodiment of the invention, an optical touch system includes a touch surface, a reflection structure and a plurality of sensing modules. The reflection structure is disposed at a periphery of the touch surface and surrounding the touch surface. The sensing modules are disposed at the periphery of the touch surface, wherein each of the sensing modules has a light-emitting unit and a sensing unit, each of the light-emitting units is adapted to emit a sensing light, and each of the sensing units is adapted to sense a brightness value distribution of the sensing light after the sensing light is reflected by the reflection structure, so as to determine whether the touch surface receives a touch input. The periphery of the touch surface includes a first section and a second section opposite to each other, parts of the sensing modules are located at the first section and compose a first group, and another parts of the sensing modules are located at the second section and compose a second group. When at least one of the light-emitting units of the first group emits the sensing light toward the second section, the sensing light is not reflected by the reflection structure at the sensing modules of the second group so that at least one low-brightness area is formed in the brightness value distribution, and each of the light-emitting units of the second group emits a compensation light to compensate the low-brightness area.

In an embodiment of the invention, a touch sensing method is adapted to an optical touch system. The optical touch system includes a touch surface, a reflection structure and a plurality of sensing modules. Each of the sensing modules has a light-emitting unit and a sensing unit, parts of the sensing modules compose a first group, and another parts of the sensing modules compose a second group. The touch sensing method includes the following steps. A sensing light is emitted by at least one of the light-emitting units of the first group, wherein the sensing light is not reflected by the reflection structure at the sensing modules of the second group, so that at least one low-brightness area is formed in a brightness value distribution of the sensing light after the sensing light is reflected by the reflection structure. A compensation light is emitted by each of the light-emitting units of the second group to compensate the low-brightness area. The brightness value distribution is sensed by each of the sensing units of the first group to determine whether the touch surface receives a touch input.

Several exemplary embodiments accompanied with figures are described in detail below to further explain the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6A to FIG. 6C are schematic diagrams illustrating a signal fault caused by the low-brightness area in FIG. 5 is compensated.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
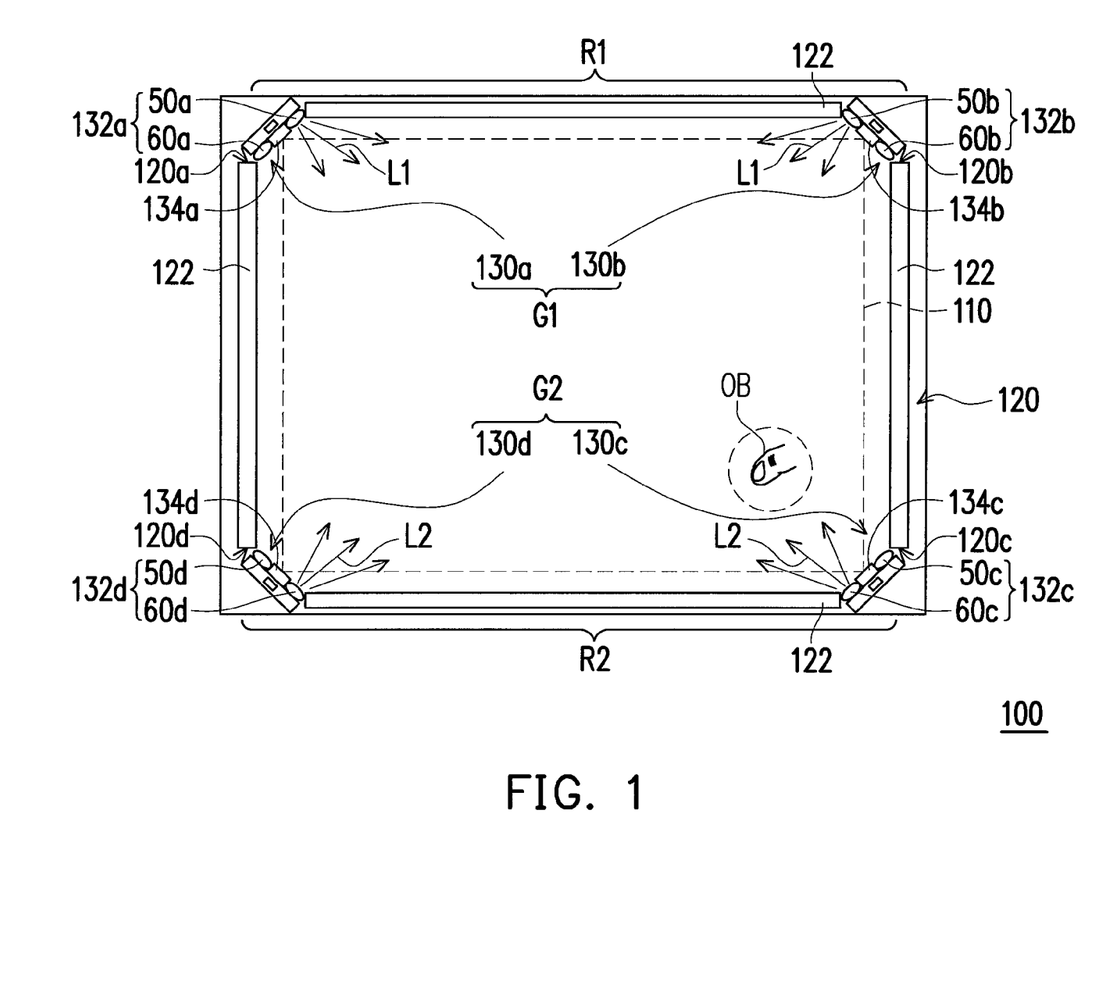
FIG. 1 is a schematic diagram illustrating an optical touch system according to an embodiment of the invention.

FIG. 1 is a schematic diagram illustrating an optical touch system according to an embodiment of the invention. Referring to FIG. 1, an optical touch system 100 of the present embodiment includes a touch surface 110, a reflection structure 120 and a plurality of sensing modules 130a-130d (four are shown). The optical touch system 100 is, for example, adapted to a display device or other touch device (such as electronic whiteboard), and the touch surface 110 could be a display surface of the display device, a operation surface of the touch device or a plane at a slight distance from the display surface or the operation surface.

The reflection structure 120 is disposed at a periphery of the touch surface 110 and surrounding the touch surface 110. The reflection structure 120 includes a plurality of reflection side strips 122 (four are shown), and the reflection side strips 122 are arranged separately along the periphery of the touch surface 110 to forms a plurality of gaps 120a-120d (four are shown). The sensing module 130a-130d are disposed at the periphery of the touch surface 110 and located in the gaps 120a-120d respectively. The periphery of the touch surface 110 includes a first section R1 and a second section R2 opposite to each other, the sensing modules 130a and the sensing modules 130b are located at the first section R1 and compose a first group G1, and the sensing modules 130c and the sensing modules 130d are located at the second section R2 and compose a second group G2.

In the present embodiment, each of the sensing modules has a light-emitting unit and a sensing unit. Specifically, the sensing module 130a has a light-emitting unit 132a and a sensing unit 134a, the sensing module 130b has a light-emitting unit 132b and a sensing unit 134b, the sensing module 130c has a light-emitting unit 132c and a sensing unit 134c, and the sensing module 130d has a light-emitting unit 132d and a sensing unit 134d. Each of the light-emitting units is able to emit a sensing light, and each of the sensing units is able to obtain a brightness value distribution of the sensing light after the sensing light is reflected by the reflection structure 120, so as to sense touch input on the touch surface 110. The details are explicated below.

As shown in FIG. 1, the light-emitting unit 132a and the light-emitting unit 132b of the first group G1 are able to emit sensing light L1 toward the second section R2 simultaneously or by turns 1 (shown as the light-emitting unit 132a and the light-emitting unit 132b emit the sensing light simultaneously). The sensing unit 134a and the sensing unit 134b of the first group G1 are able to sense a brightness value distribution of the sensing light L1 after the sensing light L1 is reflected by the reflection structure 120, so as to sense a position of a shadow caused by an object OB (such as a finger of a user) which obstructs the light reflected by the reflection structure 120, and a touch position of the object OB is calculated accordingly, so as to determine whether the touch surface receives a touch input.

The reflection structure 120 at the second section R2 has the gap 120c and the gap 120d corresponding to the sensing module 132c and the sensing module 132d of the second group G2, therefore the sensing light L1 is not reflected by the reflection structure 120 at the sensing module 132c and the sensing module 132d during the above-mentioned touch sensing process, such that a low-brightness area is formed in the brightness value distribution. Correspondingly, the light-emitting unit 132c and the light-emitting unit 132d of the second group G2 emit compensation light L2 to compensate the low-brightness area. Thus, the problem of dark point (the above-mentioned low-brightness area) caused by lacking of reflected light at the sensing module 132c and the sensing module 132d could be compensated by the compensation light L2, such that the sensing unit 134a and the sensing unit 134b are able to determine the amount and position of the touch object OB correctly.

Figure 2:
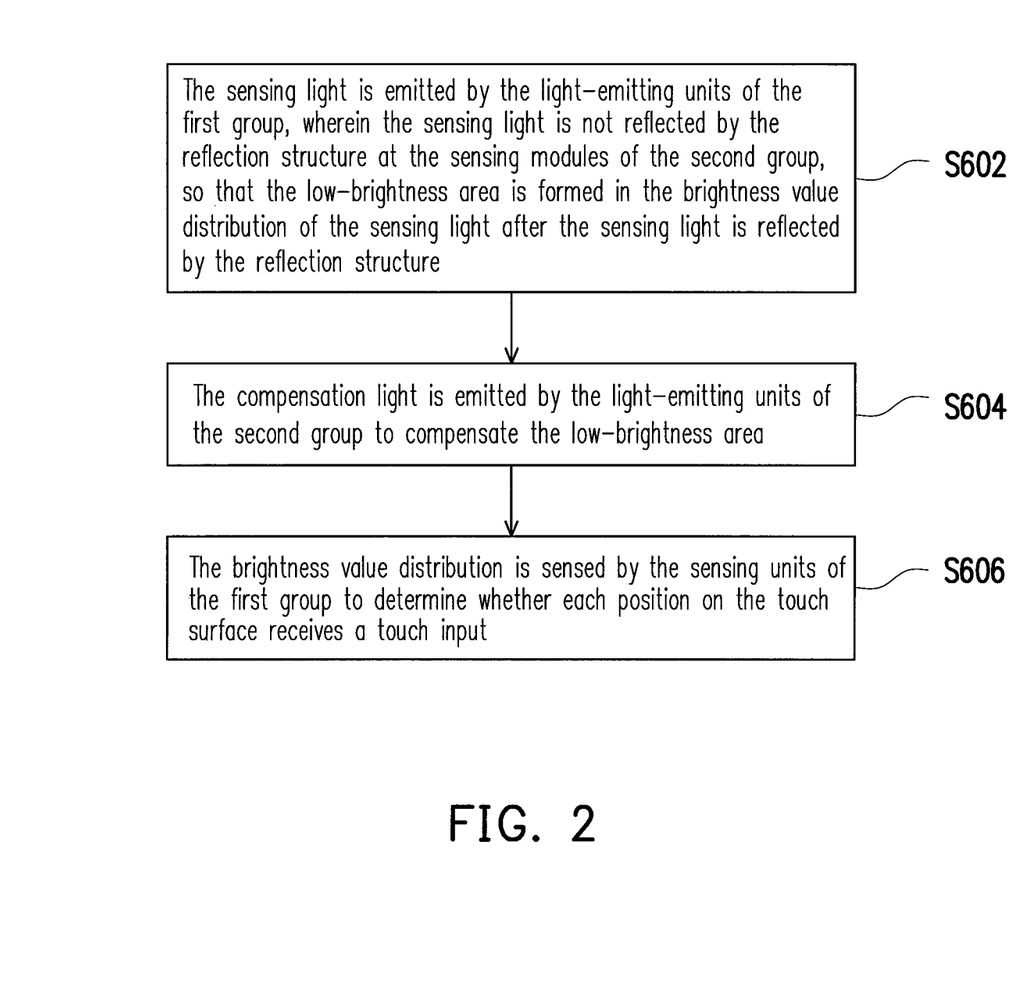
FIG. 2 is a flowchart of a touch sensing method of the optical touch system in FIG. 1.

The optical touch system 100 of FIG. 1 is taken as an example to describe a touch sensing method of the invention. FIG. 2 is a flowchart of a touch sensing method of the optical touch system in FIG. 1. Referring to FIG. 1 and FIG. 2, the sensing light L1 is emitted by the light-emitting units 132a, 132b of the first group G1, wherein the sensing light L1 is not reflected by the reflection structure 120 at the sensing modules 130c, 130d of the second group G2, so that the low-brightness area is formed in the brightness value distribution of the sensing light L1 after the sensing light L1 is reflected by the reflection structure 120 (step S602). The compensation light L2 is emitted by the light-emitting units 132c, 132d of the second group G2 to compensate the low-brightness area (step S604). The brightness value distribution is sensed by the sensing units 134a, 134b of the first group G1 to determine whether the touch surface 110 receives a touch input (step S606).

Figure 3:
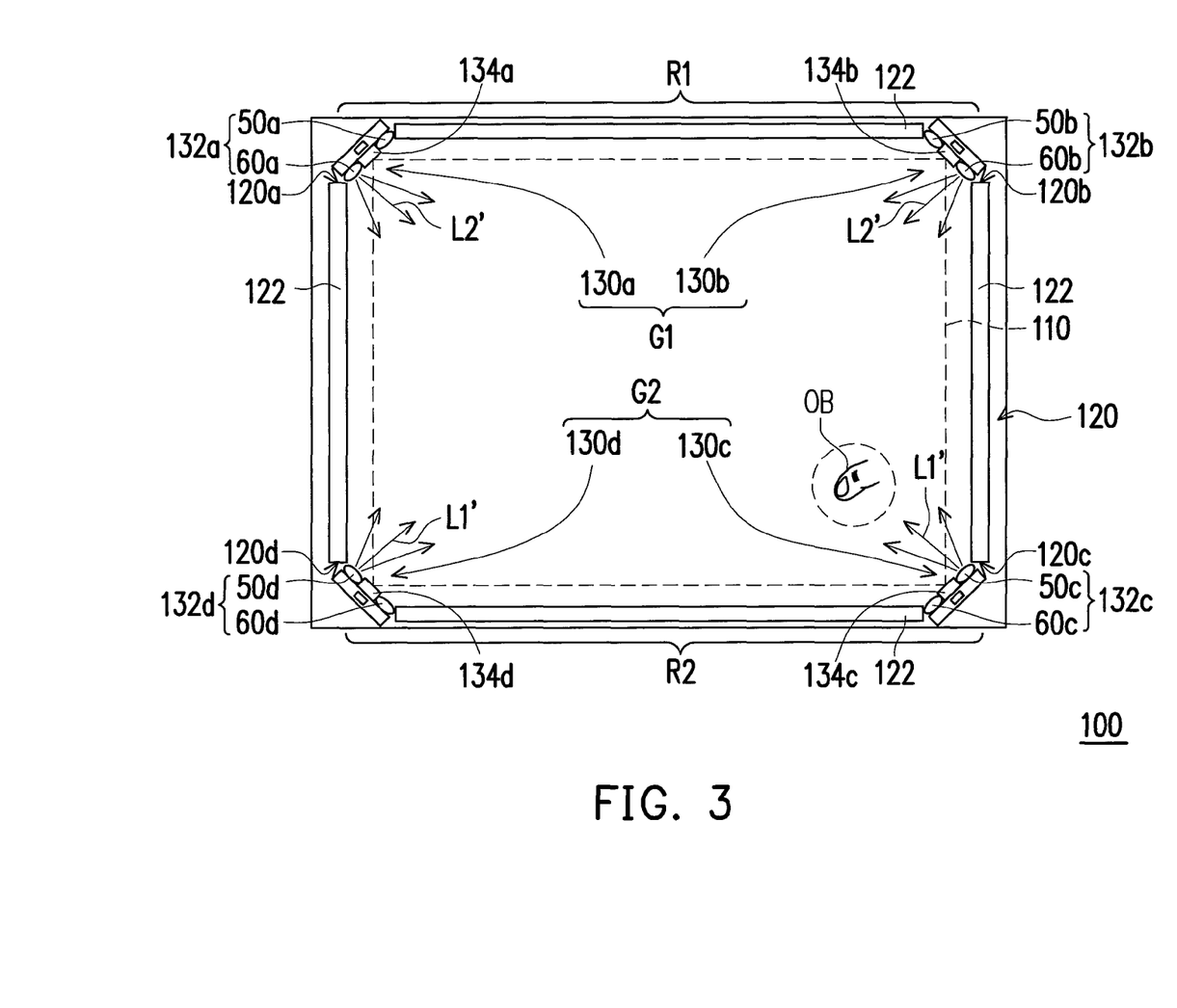
FIG. 3 is a schematic diagram illustrating that the first group and the second group depicted in FIG. 1 switches operation states.

FIG. 3 is a schematic diagram illustrating that the first group and the second group depicted in FIG. 1 switches operation states. Referring to FIG. 3, similar to the touch sensing principle, the light-emitting unit 132c and the light-emitting unit 132d of the second group G2 are able to emit a sensing light L1' toward the first section R1 simultaneously or by turns (shown as the light-emitting unit 132c and the light-emitting unit 132d emit the sensing light simultaneously). The sensing unit 134c and the sensing unit 134d of the second group G2 are able to sense a brightness value distribution of the sensing light L1' after the sensing light L1' is reflected by the reflection structure 120, so as to sense a position of a shadow caused by an object OB (such as a finger of a user) which obstructs the light reflected by the reflection structure 120, and a touch position of the object OB is calculated accordingly, so as to determine whether the touch surface receives a touch input.

The reflection structure 120 at the first section R1 has the gap 120a and the gap 120b corresponding to the sensing module 132a and the sensing module 132b of the first group G1, therefore the sensing light L1' is not reflected by the reflection structure 120 at the sensing module 132a and the sensing module 132b during the above-mentioned touch sensing process, such that a low-brightness area is formed in the brightness value distribution. Correspondingly, the light-emitting unit 132a and the light-emitting unit 132b of the first group G1 emit compensation light L2' to compensate the low-brightness area. Thus, the problem of dark point (the above-mentioned low-brightness area) caused by lacking of reflected light at the sensing module 132a and the sensing module 132b could be compensated by the compensation light L2', such that the sensing unit 134c and the sensing unit 134d are able to determine the amount and position of the touch object OB correctly.

A specific process of the operation states of the first group and the second group shown in FIG. 3 is described as follows. The sensing light L1' is emitted by the light-emitting units 132c, 132d of the second group G2, wherein the sensing light L1' is not reflected by the reflection structure 120 at the sensing modules 130a, 130b of the first group G1, so that a low-brightness area is formed in the brightness value distribution of the sensing light L1' after the sensing light L1' is reflected by the reflection structure 120. Then, the compensation light L2' is emitted by the light-emitting units 132a, 132b of the first group G1 to compensate the low-brightness area. After that, the brightness value distribution is sensed by the sensing units 134c, 134d of the second group G2, so as to determine whether the touch surface 110 receives a touch input.

In the present embodiment, when the light-emitting unit 132a and the light-emitting unit 132b of the first group G1 emit the sensing light L1 toward the second section R2 as shown in FIG. 1, the function of the second group G2 is emitting the corresponding compensation light L2 by the light-emitting unit 132c and the light-emitting unit 132d thereof. Therefore, at this time, the light-emitting unit 132c and the light-emitting unit 132d of the second group G2 are controlled not to emit the sensing light L1' (shown in FIG. 3) and the sensing unit 134c and the sensing unit 134d of the second group G2 are controlled to be inactive or not to process the brightness value distribution sensed. When the light-emitting unit 132c and the light-emitting unit 132d of the second group G2 emit the sensing light L1' toward the first section R1 as shown in FIG. 3, the function of the first group G1 is emitting the corresponding compensation light L2' by the light-emitting unit 132a and the light-emitting unit 132b thereof. Therefore, at this time, the light-emitting unit 132a and the light-emitting unit 132b of the first group G1 are controlled not to emit the sensing light L1 (shown in FIG. 1) and the sensing unit 134a and the sensing unit 134b of the first group G1 are controlled to be inactive (not to be actuated and enabled or not to process the brightness value distribution sensed).

The optical touch system 100 of the present embodiment, for example, keeps being switched between the operation state shown in FIG. 1 and the operation state shown in FIG. 3 alternately. Thus, the low-brightness area caused by the gap 120c and the gap 120d of the reflection structure 120 is compensated by the compensation light L2 emitted from the second group G2 while the sensing light L1 is emitted from the first group G1 as above-mentioned, and the low-brightness area caused by the gap 120a and the gap 120b of the reflection structure 120 is compensated by the compensation light L2' emitted from the first group G1 while the sensing light L1' is emitted from the second group G2 as above-mentioned. Accordingly, the optical touch system 100 achieves excellent sensing accuracy while performing multi-touch sensing by a large number of the sensing modules 130a-130d.

Figure 4:
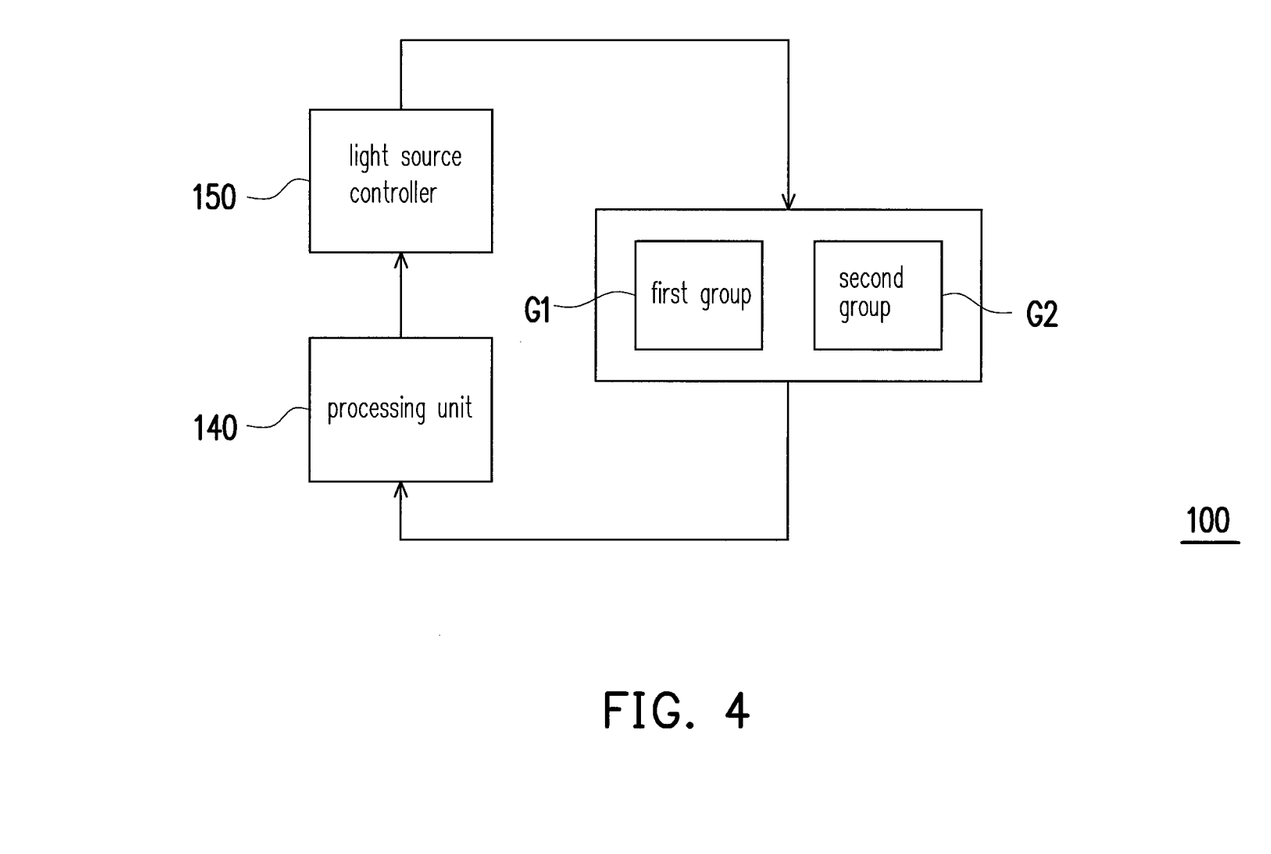
FIG. 4 is a block diagram illustrating partial elements of the optical touch system in FIG. 1.

FIG. 4 is a block diagram illustrating partial elements of the optical touch system in FIG. 1. Referring to FIG. 1, FIG. 3 and FIG. 4, in the present embodiment, the optical touch system 100 further includes a processing unit 140 and a light source controller 150. The processing unit 140 is adapted to determine whether the compensation light L2 shown in FIG. 1 is sufficient to compensate the low-brightness area caused by the gaps 120c, 120d of the reflection structure 120, and is adapted to determine whether the compensation light L2' shown in FIG. 3 is sufficient to compensate the low-brightness area caused by the gaps 120a, 120b of the reflection structure 120. The light source controller 150 is adapted to control the light-emitting units 132a, 132b to emit the sensing light L1 as shown in FIG. 1 or to emit the compensation light L2' as shown in FIG. 3, and is adapted to control the light-emitting units 132c, 132d to emit the sensing light L1' as shown in FIG. 3 or to emit the compensation light L2 as shown in FIG. 1. The first group G1 and the second group G2 may be controlled to emit the sensing light by turns by the light source controller 150, such that the optical touch system 100 keeps being switched between the operation state shown in FIG. 1 and the operation state shown in FIG. 3 alternately. In addition, when the source controller 150 controls the first group G1 to emit the sensing light L1, the light source controller 150 further controls the light-emitting unit 132a and the light-emitting unit 132b of the first group G1 emit the sensing light L1 simultaneously or by turns, and when the source controller 150 controls the second group G2 to emit the sensing light L1', the light source controller 150 further controls the light-emitting unit 132c and the light-emitting unit 132d of the second group G2 emit the sensing light L1' simultaneously or by turns.

In the embodiment, an intensity of the compensation light L2 emitted from the second group G2 is controlled to be lower than an intensity of the sensing light L1 emitted from the first group G1, and an intensity of the compensation light L2' emitted from the first group G1 is controlled to be lower than an intensity of the sensing light L1' emitted from the second group G2 by the light source controller 150, for example. The reason for the above-mentioned controlling manner applied to the first group G1 and the second group G2 is that, after the sensing light (L1 or L1') is reflected by the reflection structure 120, the intensity of the reflected light is lower than the intensity of the original sensing light, so if the intensity of the compensate light (L2 or L2') is equal to or larger than the intensity of the sensing light, then the intensity of the compensate light received by the sensing unit will larger the intensity of the reflected light of the sensing light, which causes phenomenon of over-exposure and sensing signal distortion accordingly happens to the sensing unit.

Figure 5:
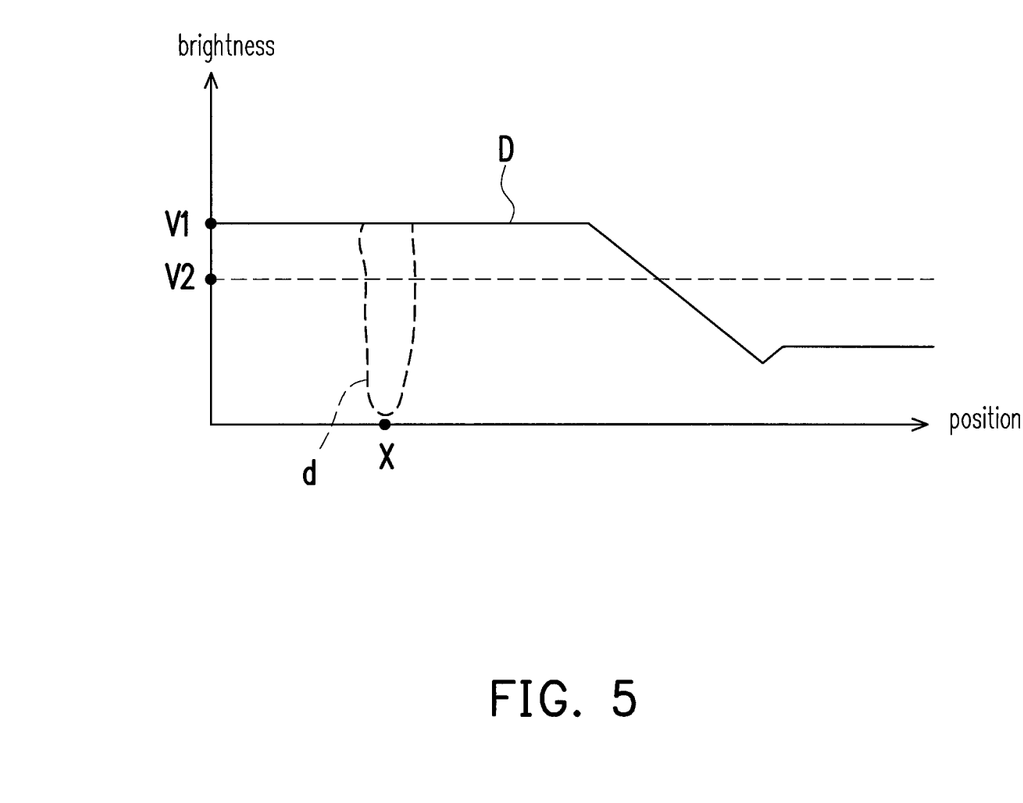
FIG. 5 is a schematic diagram illustrating a brightness value distribution of the sensing light in FIG. 1 after being reflected by the reflection structure.
Figure 6A:
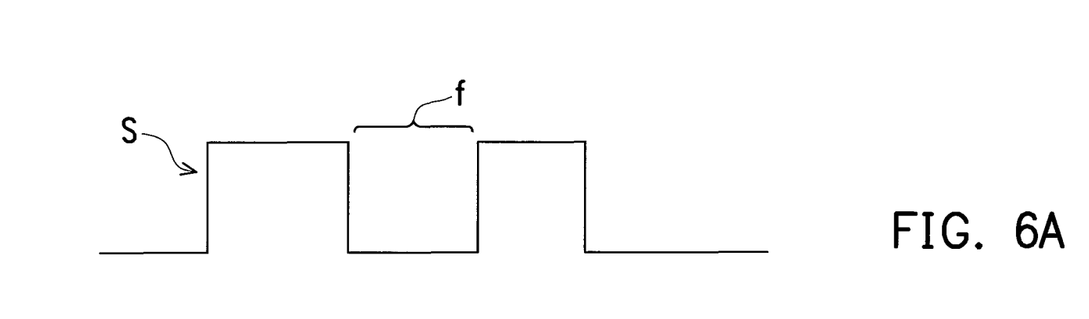
Figure 6B:
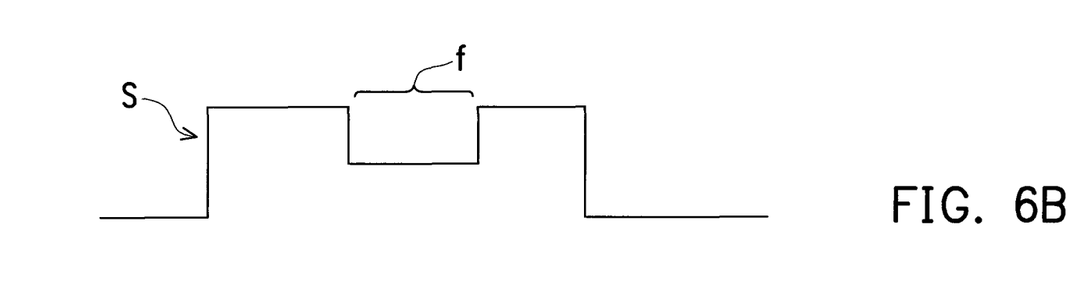
Figure 6C:
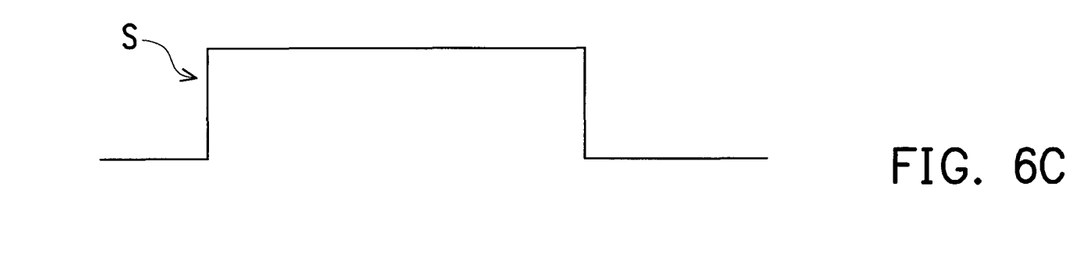

The manner that the compensation light compensates the low-brightness area is described in detail hereinafter with reference to the drawings. FIG. 5 is a schematic diagram illustrating a brightness value distribution of the sensing light in FIG. 1 after being reflected by the reflection structure. FIG. 6A to FIG. 6C are schematic diagrams illustrating a signal fault caused by the low-brightness area in FIG. 5 is compensated. The sensing light L1 emitted by the light-emitting unit 132a and the light-emitting unit 132b and the gap 120c of the reflection structure 120 in FIG. 1 is taken as an example. After the sensing light L1 emitted by the light-emitting unit 132a and the light-emitting unit 132b is reflected by the reflection structure 120, the sensing light L1 has the brightness value distribution D shown in FIG. 5, for example. The reflection structure 120 is unable to reflect the sensing light L1 at the gap 120c so that the low-brightness area d is formed in the brightness value distribution D. The signal S shown in FIG. 6A to FIG. 6C is a signal corresponding to the brightness value distribution D of FIG. 5, wherein the low-brightness area d of FIG. 5 will cause the signal S to generate a signal fault f as shown in FIG. 6A.

The existence of the low-brightness area d and the corresponding signal fault f may cause the optical touch system 100 to mistake it as a touch input. Hence, the signal fault f has to be compensated as shown in FIG. 6B to FIG. 6C by the compensation light L2 emitted from the light-emitting unit 132c of FIG. 1. Specifically, in the present embodiment, if the signal fault f can not be compensated to become the state shown in FIG. 6C by the compensation light L2 emitted from the light-emitting unit 132c and the processing unit 140 accordingly determines the compensation light L2 is not sufficient to compensate the signal fault f and the corresponding low-brightness area d, then the light source controller 150 of FIG. 4 correspondingly increases the intensity of the compensation light L2 until the brightness of the compensation light L2 is substantially the same as the brightness of the reflected light of the sensing light L1 and the signal fault f is compensated to become the state shown in FIG. 6C. At this time, the processing unit 140 determines the compensation light L2 is sufficient to compensate the signal fault f and the corresponding low-brightness area d.

In the present embodiment, when a brightness value of the low-brightness area d is compensated to be equal to the standard value V1 shown in FIG. 5 by the compensation light L2, the low-brightness area d is entirely compensated and the processing unit 140 of FIG. 4 determines the compensation light L2 is sufficient to compensate the low-brightness area d as above-mentioned. However, the invention does not limit the determination standard of the processing unit 140. The processing unit 140 may have lower determination standard for the compensation light L2. For instance, under a condition that the touch sensing sensitivity of the optical touch system 100 is set to be lower (for example, the touch sensing sensitivity is set as follows: if the brightness value at the position X shown in FIG. 5 is sensed to be lower than the threshold value V2, then determining a touch input is received at the position X), the determination standard of the processing unit 140 could be correspondingly set as follows: if a brightness value of the low-brightness area d is compensated to be equal to or larger than the threshold value V2 by the compensation light L2, then the processing unit 140 determines the compensation light L2 is sufficient to compensate the low-brightness area d, wherein the threshold value V2 is, for example, 75% of the standard value V1 or other suitable value lower than the standard value V1. The threshold value V2 and the standard value V1 are, for example, respectively corresponding to the signal state shown in FIG. 6B and the signal state shown in FIG. 6C. If the determination standard of the processing unit 140 has a lower setting value as above-mentioned, then the compensation light L2 is sufficient to compensate the signal f and the corresponding low-brightness area d while the signal S is compensated to become the state shown in FIG. 6B.

In the present embodiment, each light-emitting unit emits the sensing light and the compensation light by two light-emitting elements respectively, which is described in detail hereinafter. Referring to FIG. 1 and FIG. 3, the light-emitting unit 132a includes a first light-emitting element 50a and a second light-emitting element 60a adapted to emit the sensing light L1 and the compensation light L2' respectively. Similarly, the light-emitting unit 132b includes a first light-emitting element 50b and a second light-emitting element 60b adapted to emit the sensing light L1 and the compensation light L2' respectively. The light-emitting unit 132c includes a first light-emitting element 50c and a second light-emitting element 60c adapted to emit the sensing light L1' and the compensation light L2 respectively. The light-emitting unit 132d includes a first light-emitting element 50d and a second light-emitting element 60d adapted to emit the sensing light L1' and the compensation light L2 respectively. However, the invention does not limit thereto. In other embodiments, each light-emitting unit may only includes one light-emitting element, and the light-emitting intensity of the light-emitting element is adjustable, such that the light-emitting element is adapted to emit the sensing light or emit the compensation light. The light-emitting element is, for example, a light emitting diode (LED) light source or other adaptive type of light source, the invention does not limit thereto.

Figure 7:
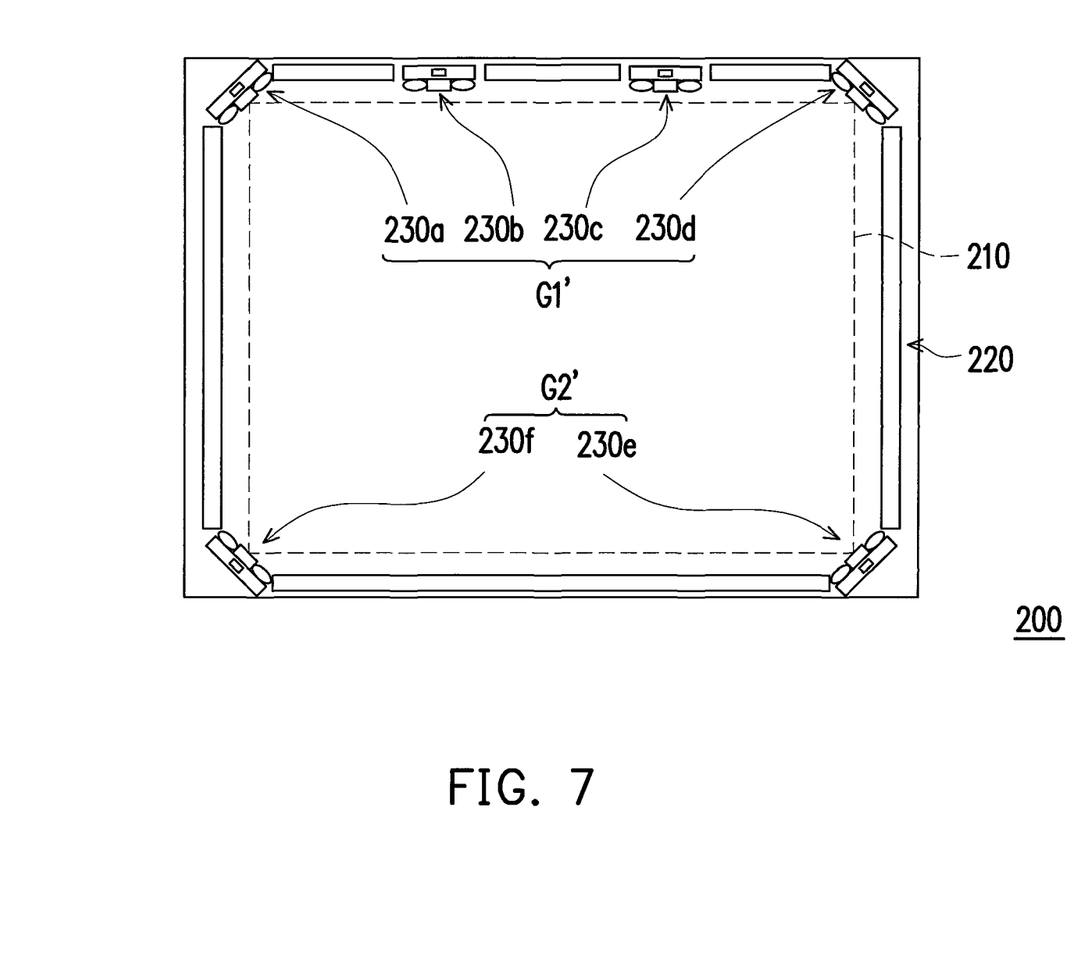
FIG. 7 is a schematic diagram illustrating an optical touch system according to another embodiment of the invention.

The invention does not limit the amount of the sensing modules, and examples accompanied with figures are provided below to further describe the disclosure. FIG. 7 is a schematic diagram illustrating an optical touch system according to another embodiment of the invention. In the optical touch system 200 of FIG. 7, configuration and operation of the touch surface 210, the reflection structure 220, the first group G1' and the second group G2' are similar to configuration and operation of the touch surface 110, the reflection structure 120, the first group G1 and the second group G2 of FIG. 1 and FIG. 3, which are not repeated. A difference between the optical touch system 200 and the optical touch system 100 is the amount of the sensing modules. As shown in FIG. 7, the first group G1' includes four sensing modules (the sensing module 230a, the sensing module 230b, the sensing module 230c and the sensing module 230d), and the second group G2' includes two sensing modules (the sensing module 230e and the sensing module 230O. In other embodiments, the first group G1' and the second group G2' may have other suitable number of sensing modules respectively, and the invention does not limit thereto.

In addition, in the above-mentioned embodiments of the invention, the first section R1 and the second section R2 in FIG. 1 are, for example, the upper side and the lower side of the touch surface 110, respectively. However, the invention does not limit thereto. The touch surface 110 may be separated horizontally so that the half upper region of the touch surface 110 is the first section R1 and the half lower region of the touch surface 110 is the second section R2. Otherwise, the touch surface 110 may be separated vertically so that the half left region of the touch surface 110 is the first section R1 and the half right region of the touch surface 110 is the second section R2. The touch surface 110 may also be separated diagonally so that the half upper left region of the touch surface 110 is the first section R1 and the half lower right region of the touch surface 110 is the second section R2. In other embodiments, the sensing modules with a "face to face" (parts of the sensing modules are opposite to another parts of the sensing modules) problem may be appropriately separated into groups in other adaptive manners.

In summary, in the optical touch system of the invention, when the light-emitting units of the first group emit the sensing light for sensing touch input, the light-emitting units of the second group opposite to the first group emit compensation light. Thus, the dark point caused by lacking of reflected light at the gaps of the reflection structure could be compensated by the compensation light, and the sensing units of the second group are inactive at this time. On the contrary, when the light-emitting units of the second group emit the sensing light for sensing touch input, the first group compensates the dark point by the compensation light and does not perform sensing operation in the same way, such that the sensing units are able to determine the amount and position of the touch object correctly, enabling the optical touch system to accurately perform multi-touch sensing by a large number of the sensing modules.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical touch system, comprising:
    a touch surface;
    a reflection structure, disposed at a periphery of the touch surface and surrounding the touch surface; and
    a plurality of sensing modules, disposed at the periphery of the touch surface, wherein each of the sensing modules has a light-emitting unit and a sensing unit, each of the light-emitting units is adapted to emit a sensing light, and each of the sensing units is adapted to sense a brightness value distribution of the sensing light after the sensing light is reflected by the reflection structure, so as to determine whether the touch surface receives a touch input,
    wherein the periphery of the touch surface comprises a first section and a second section opposite to each other, parts of the sensing modules are located at the first section and compose a first group, and another parts of the sensing modules are located at the second section and compose a second group, wherein when at least one of the light-emitting units of the first group emits the sensing light toward the second section, the sensing light is not reflected by the reflection structure at the sensing modules of the second group so that at least one low-brightness area is formed in the brightness value distribution, and each of the light-emitting units of the second group emits a compensation light to compensate the low-brightness area.

2. The optical touch system according to claim 1, wherein when at least one of the light-emitting units of the second group emits the sensing light toward the first section, the sensing light is not reflected by the reflection structure at the sensing modules of the first group so that at least one low-brightness area is formed in the brightness value distribution, and each of the light-emitting units of the first group emits a compensation light to compensate the low-brightness area.

3. The optical touch system according to claim 1, wherein when at least one of the light-emitting units of the first group emits the sensing light toward the second section, each of the light-emitting units of the second group does not emit the sensing light and each of the sensing units of the second group is inactive, and when at least one of the light-emitting units of the second group emits the sensing light toward the first section, each of the light-emitting units of the first group does not emit the sensing light and each of the sensing units of the first group is inactive.

4. The optical touch system according to claim 1, wherein an intensity of the compensation light is lower than an intensity of the sensing light.

5. The optical touch system according to claim 1, wherein each of the light-emitting units comprises a light-emitting element, and a light-emitting intensity of the light-emitting element is adjustable, such that the light-emitting element is adapted to emit the sensing light or emit the compensation light.

6. The optical touch system according to claim 1, wherein each of the light-emitting units comprises a first light-emitting element and a second light-emitting element, the first light-emitting element is adapted to emit the sensing light, and the second light-emitting element is adapted to emit the compensation light.

7. The optical touch system according to claim 1, further comprising:
    a processing unit, adapted to determine whether the compensation light is sufficient to compensate the low-brightness area; and
    a light source controller, adapted to control each of the light-emitting units to emit the sensing light or the compensation light, wherein if the compensation light is not sufficient to compensate the low-brightness area, then the light source controller increases an intensity of the compensation light until the compensation light is sufficient to compensate the low-brightness area.

8. The optical touch system according to claim 7, wherein if the compensation light is able to compensate a brightness value of the low-brightness area to be equal to or larger than a threshold value, then the processing unit determines the compensation light is sufficient to compensate the low-brightness area.

9. The optical touch system according to claim 8, wherein when the compensation light compensates the brightness value of the low-brightness area to be equal to a standard value, the low-brightness area is entirely compensated, wherein the threshold value is lower than the standard value.

10. The optical touch system according to claim 1, wherein the reflection structure comprises a plurality of reflection side strips, the reflection side strips are arranged separately along the periphery of the touch surface to form a plurality of gaps, and the sensing modules are located in the gaps respectively.

11. A touch sensing method, adapted to an optical touch system, the optical touch system comprising a touch surface, a reflection structure and a plurality of sensing modules, each of the sensing modules having a light-emitting unit and a sensing unit, parts of the sensing modules composing a first group, another parts of the sensing modules composing a second group, the touch sensing method comprising:
    emitting a sensing light by at least one of the light-emitting units of the first group, wherein the sensing light is not reflected by the reflection structure at the sensing modules of the second group, so that at least one low-brightness area is formed in a brightness value distribution of the sensing light after the sensing light is reflected by the reflection structure;
    emitting a compensation light by each of the light-emitting units of the second group to compensate the low-brightness area; and
    sensing the brightness value distribution by each of the sensing units of the first group to determine whether the touch surface receives a touch input.

12. The touch sensing method according to claim 11, further comprising:
    emitting a sensing light by at least one of the light-emitting units of the second group, wherein the sensing light is not reflected by the reflection structure at the sensing modules of the first group, so that at least one low-brightness area is formed in a brightness value distribution of the sensing light reflected by the reflection structure;

emitting a compensation light by each of the light-emitting units of the first group to compensate the low-brightness area; and sensing the brightness value distribution by each of the sensing units of the second group to determine whether the touch surface receives a touch input.

13. The touch sensing method according to claim 12, further comprising:

when at least one of the light-emitting units of the first group emits the sensing light, each of the light-emitting units of the second group does not emit the sensing light and each of the sensing units of the second group is inactive; and when at least one of the light-emitting units of the second group emits the sensing light, each of the light-emitting units of the first group does not emit the sensing light and each of the sensing units of the first group is inactive.

14. The touch sensing method according to claim 12, wherein the steps of emitting the sensing light by each of the light-emitting units comprising:

controlling the first group and the second group to emit the sensing light by turns through a light source controller.

15. The touch sensing method according to claim 12, wherein the steps of emitting the sensing light by each of the light-emitting units comprising:

controlling the light-emitting units of the first group to emit the sensing light simultaneously or by turns through a light source controller; and controlling the light-emitting units of the second group to emit the sensing light simultaneously or by turns through a light source controller.

16. The touch sensing method according to claim 11, wherein the steps of emitting the sensing light and the compensation light by each of the light-emitting units comprising:

when the first group emits one of the sensing light and the compensation light and the second group emits another one of the sensing light and the compensation light, controlling an intensity of the compensation light to be lower than an intensity of the sensing light by a light source controller.

17. The touch sensing method according to claim 11, further comprising:

determining whether the compensation light is sufficient to compensate the low-brightness area by a processing unit; and if the compensation light is not sufficient to compensate the low-brightness area, then increasing an intensity of the compensation light by a light source controller until the compensation light is sufficient to compensate the low-brightness area.

18. The touch sensing method according to claim 17, wherein the step of determining whether the compensation light is sufficient to compensate the low-brightness area comprising:

If the compensation light is able to compensate a brightness value of the low-brightness area to be equal to a standard value so that the low-brightness area is entirely compensated, then the processing unit determines the compensation light is sufficient to compensate the low-brightness area.

19. The touch sensing method according to claim 17, wherein the step of determining whether the compensation light is sufficient to compensate the low-brightness area comprising:

If the compensation light is able to compensate the brightness value of the low-brightness area to be equal to or larger than a threshold value, then the processing unit determines the compensation light is sufficient to compensate the low-brightness area, wherein the threshold value is lower than a standard value, and when the compensation light compensates the brightness value of the low-brightness area to be equal to the standard value, the low-brightness area is entirely compensated.

* * * * *